(12) United States Patent
Shah (10) Patent No.: US 11,797,032 B2
(45) Date of Patent: Oct. 24, 2023

(54) AUTO DRAIN VALVE

(71) Applicant: ROTEX AUTOMATION LIMITED, Gujarat (IN)

(72) Inventor: Nirav Shah, Gujarat (IN)

(73) Assignee: ROTEX AUTOMATION LIMITED, Gujarat (IN)

( * ) Notice: Subject to any disclaimer, the term of this patent is extended or adjusted under 35 U.S.C. 154(b) by 0 days.

(21) Appl. No.: 17/013,703

(22) Filed: Sep. 7, 2020

(65) Prior Publication Data

US 2021/0096584 A1 Apr. 1, 2021

(30) Foreign Application Priority Data

Sep. 5, 2019 (IN) .............................. 201921035695

(51) Int. Cl.
| | |
|---|---|
| *F16K 1/36* | (2006.01) |
| *F16K 31/06* | (2006.01) |
| *G05D 9/12* | (2006.01) |
| *F02M 37/24* | (2019.01) |
| *B60K 15/035* | (2006.01) |
| *B60K 15/03* | (2006.01) |

(52) U.S. Cl.
CPC ............... *G05D 9/12* (2013.01); *F02M 37/24* (2019.01); *F16K 1/36* (2013.01); *F16K 31/0655* (2013.01); *B60K 15/035* (2013.01); *B60K 2015/03236* (2013.01); *B60K 2015/03256* (2013.01); *Y10T 137/3052* (2015.04); *Y10T 137/3105* (2015.04); *Y10T 137/7313* (2015.04); *Y10T 137/7316* (2015.04)

(58) Field of Classification Search
CPC ......... Y10T 137/3052; Y10T 137/3105; Y10T 137/7313; Y10T 137/7316; F16K 1/36; F16K 31/0655; F16K 1/46; G05D 9/12; F02M 37/24; F02M 37/28; F02M 37/54; B01D 17/12; B01D 19/0063; B60K 15/035; B60K 2015/03236; B60K 2015/03256
See application file for complete search history.

(56) References Cited

U.S. PATENT DOCUMENTS

| | | | | |
|---|---|---|---|---|
| 3,004,670 A | * | 10/1961 | Zonker | ............... B01D 35/005 |
| | | | | 210/429 |
| 3,419,034 A | * | 12/1968 | Hart | ..................... B08B 9/0933 |
| | | | | 137/392 |
| 5,207,251 A | * | 5/1993 | Cooks | ..................... G05D 9/12 |
| | | | | 73/299 |

(Continued)

*Primary Examiner* — Matthew W Jellett
(74) *Attorney, Agent, or Firm* — Mark M. Friedman (57) ABSTRACT

An auto drain valve 100 comprises a valve body 222 wherein a piston 111 having a piston rod 08 with sealing disk 07 and sealing member 03 which is movable within said valve body 222 wherein air vent 30 and liquid outlet 40 and closes simultaneously. Further the valve body 222 is connected to the bowl 10; valve body 222 consisting of air vent 30, liquid inlet 40' and liquid outlet 40; moveable piston 111, solenoid coil 9 surrounding the piston rod 08; spring 01 and spring 02 resiliently biasing on the Piston 111 seal air vent 30 and liquid outlet 40 in its de-energized condition; when the solenoid coil 09 is energized and Piston 111 moves away from air vent 30 and liquid outlet 40 simultaneously, liquid is drained form bowl 10 through liquid inlet 40' into valve body 222 and drained out form liquid outlet 40.

8 Claims, 7 Drawing Sheets

(56) References Cited

U.S. PATENT DOCUMENTS

| | | | | |
|---|---|---|---|---|
| 6,974,120 B2* | 12/2005 | Wilson | ................ | F16K 31/0655 |
| | | | | 251/129.21 |
| 8,267,375 B1* | 9/2012 | LaHousse | ........... | F15B 13/0405 |
| | | | | 403/381 |
| 8,409,446 B2* | 4/2013 | Abdalla | ................. | F02M 37/34 |
| | | | | 210/114 |
| 9,684,313 B2* | 6/2017 | Chajec | ................. | B01D 36/006 |
| 9,751,034 B2* | 9/2017 | Zuccone | ............. | B01D 36/005 |
| 9,951,881 B2* | 4/2018 | Shah | ................... | F16K 37/0025 |
| 10,253,902 B2* | 4/2019 | Warashina | .......... | F16K 31/0675 |
| 10,711,910 B2* | 7/2020 | Shah | ....................... | F16K 31/06 |
| 10,969,802 B2* | 4/2021 | Shah | ................. | G01N 33/2847 |
| 2018/0209387 A1* | 7/2018 | Rajagopalan | ........ | B01D 36/005 |

* cited by examiner

AUTO DRAIN VALVE

FIELD OF INVENTION

The present invention relates to an auto drain valve 100 for fuel system. More particularly, the present invention comprises a valve body 222 wherein a piston 111 having a piston rod 08 with sealing disk 07 and sealing member 03, which is movable within said valve body 222 wherein air vent 30 and liquid outlet 40 closes simultaneously.

BACKGROUND OF INVENTION

A problem which occurs with fluid filter assemblies, particularly useful for diesel engines and gasoline marine engines, is facilitating the removal of contaminants from the filter assembly. These contaminants include water and particulate matter which tend to settle at the bottom of housings used to retain filter elements. In order to remove the water and particulate matter suspended in the water, drain valves are frequently positioned at the bottom of housings used to retain filter elements. If a simple drain cock is utilized for the valve, the drainage may not be complete or may not occur at all because a partial vacuum is created in the filter housing upon initiating drainage. The partial vacuum prevents water from flowing through the open valve.

Fuel supply systems, and in particular vehicle fuel systems generally comprise at least one fuel filter to remove water and other contaminants from the fuel. For medium and heavy duty trucks, there is generally a need for multiple fuel filters, for instance a pre-filter for separating out water on the suction side (that is, upstream of the main fuel pump) and for removing large particulate contaminants and a final filter for removing fine particles on the pressure side (that is, downstream of the main fuel pump). It is generally necessary to continuously or periodically remove the separated water from the fuel filter in order to prevent water passing through the filter element into the fuel system and therefore reaching the engine injector nozzles. The filter media also needs to be changed at the regular intervals as it becomes clogged by contaminants leading to high pressure drop across the primary filter.

Manual water drain systems are frequently positioned in a position within the engine bay which is not easily accessed. Additionally, manual draining of water is inconvenient for the operator and if neglected can cause water to pass through the fuel filter media and enter the fuel system causing damage to the engine injector nozzles thereby reducing life of the engine.

As an alternative to manual water drain systems, solenoid activated water drain valves have been developed. Solenoid fuel drain valves are electrically operated. Operation may be controlled manually, for instance by activation of a switch within the vehicle cabin by the operator of the vehicle in response to a warning signal that water is present in the fuel filter. A problem associated with some conventional types of solenoid fuel drain valves is that the primary filter needs to be pressurised in order to expel water through the valve. This requires the provision of an additional electrical pump, which increases the cost of the filter.

However, as the improved solenoid fuel drain valve still needs to be operated by the vehicle operator there remains a chance that the operator may forget, or fail to dispose of the water correctly, risking damage to the remainder of the fuel system and the engine, in particular the injector nozzles. Additionally, the solenoid drain valve releases some fuel along with the water, which unless collected and disposed of correctly is a source of pollution.

It is an object of embodiments of the present invention to obviate one or more of the problems associated with the prior art, whether identified herein or elsewhere. In particular, it is an object of embodiments of the present invention to provide a water drain system which is suitable for operating on the suction side of a fuel supply and which eliminates the requirement for the involvement of a vehicle's operator.

SUMMARY OF THE INVENTION

The principal object of the present invention is to provide an auto drain valve 100 for fuel system and more particularly the present invention comprises a valve body 222 wherein a piston 111 having a piston rod 08 with sealing disk 07 and sealing member 03 which is movable within said valve body 222 wherein air vent 30 and liquid outlet 40 closes simultaneously.

One of the objects of the present invention is to provide an auto drain valve 100 comprising a valve body 222 is connected to the bowl 10; valve body 222 consisting of air vent 30, liquid inlet 40' and liquid outlet 40; piston 111 having a piston rod 08 with sealing disk 07 and sealing member 03 arranged within the valve body 222; Anker 06 and fixed guide 05 is mounted into cavity of valve body 222 and piston rod 08 is supported by means of fixed guide 05 and Anker 06; solenoid coil 9 surrounds the piston rod 08; spring 01 and spring 02 resiliently biasing on the Piston 111 to seal air vent 30 into sealing engagement with the sealing member 03 and liquid outlet 40 with the sealing disk 07 by means of compression force when the solenoid coil 09 is in its de-energized condition; when the solenoid coil 09 is energized and Piston 111 moves away from air vent 30 and liquid outlet 40 simultaneously, so that the valve is open, and air will enter into the bowl 10 through valve body 222 through air path 200 and liquid is drained form bowl 10 through liquid inlet 40' into valve body 222 and drained out form liquid outlet 40.

One of the objects of the present invention is to provide an auto drain valve 100 comprises a piston 111 comprises piston rod 08 with sealing disk 07 and sealing member 03 wherein spring 01 and spring 02 resiliently biasing on the sealing disk 07 and sealing member 03.

One of the objects of the present invention is to provide an auto drain valve 100 comprises a solenoid coil 09 in de-energized condition both air vent 30 and liquid inlet 40' are remain closed and during solenoid coil 09 energized condition piston rod 08 with sealing disk 07 and air vent 30 moves upward direction wherein air vent 30 and liquid outlet 40 open simultaneously. Further the magnetisable material is attached to the piston rod 08 are suitably arranged within the valve body 222 such that energisation of the solenoid coil 09 causes a magnetic field to be induced in the solenoid coil 09 and in the piston rod 08. In this embodiment, the piston rod 08 is then attracted to the solenoid coil 09, and movement of the piston rod 08 is affected.

One of the objects of the present invention is to provide an auto drain valve 100 wherein, solenoid coil 09 during de-energized condition both air vent 30 and liquid outlet 40 are remain closed and solenoid coil 09 during energized condition sealing disk 07 moves upward direction by means of piston 09 wherein air vent 30 and liquid outlet 40 open simultaneously.

One of the objects of the present invention is to provide an auto drain valve 100 consisting of valve body 222 which comprises air vent 30 and liquid outlet 40.

One of the objects of the present invention is to provide an auto drain valve 100 consisting of valve body 222 which comprises air vent 30 which allows air to enter into body of auto drain valve 100 and liquid is drained form bowl 10 through liquid inlet 40' into valve body 222 and drained out form liquid outlet 40.

One of the objects of the present invention is to provide an auto drain valve 100 wherein, valve body 222 comprises drain passage as air water path 200 connecting the air liquid inlet 40' to liquid outlet 40 drains water direct from howl 10 attached to fuel tank and does not comprises any separate chamber One of the objects of the present invention is to provide an auto drain valve 100 wherein, auto drain valve 222 comprises threading mechanism on blow 10 to disengage drain valve 100 from fuel system.

One of the objects of the present invention is to provide an auto drain valve wherein spring 01 and spring 02 resiliently biasing on the sealing disk 07 and sealing member 03 provides compression force to the sealing disk 07 and sealing members 03 and said spring 01 and spring 02 can be coil spring, helical spring, spiral spring, leaf spring.

One of the objects of the present invention is to provide an auto drain valve 100 consisting of wherein a water level indication sensor allows to energise drain valve system by reaching water at predefined level and water sensor is located into the bowl wherein said sensor measures the level of water and drain said water automatically.

One of the objects of the present invention is to provide an auto drain valve wherein manual drain mechanism is also available in any emergency conditions.

One of the objects of the present invention is to provide an auto drain valve, which is easy to disassemble for maintains.

BRIEF DESCRIPTION OF THE DRAWINGS

The objects, features and advantages of the invention will best be understood from the following description of various embodiments thereof, selected for purposes of illustration, and shown in the accompanying figures.

DETAIL DESCRIPTION OF THE INVENTION

Figure 1:
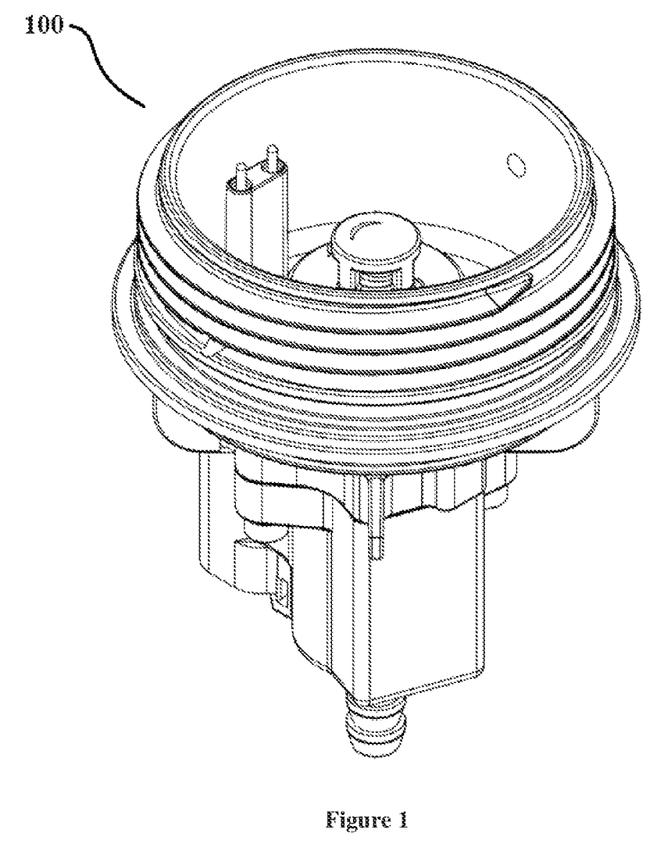
FIG. 1 is a perspective view of a preferred embodiment of an auto drain valve 100 in accordance with the principles of the present invention.

An auto drain valve 100 in accordance with the principles of the present invention as indicated in FIG. 1. The Auto drain valve 100 comprises valve body 222 having at least one air vent 30, at least one liquid inlet 40' and at least one liquid outlet 40.

The principal embodiment of the present invention is to provide an auto drain valve 100 for fuel system and more particularly the present invention comprises a valve body 222 wherein a piston 111 having a piston rod 08 with sealing disk 07 and sealing member 03 which is movable within said valve body 222 wherein air vent 30 and liquid outlet 40 and closes simultaneously.

One of the embodiments of the present invention is to provide an present invention is to provide an auto drain valve 100 comprising a valve body 222 is connected to the bowl 10; valve body 222 consisting of air vent 30, liquid inlet 40' and liquid outlet 40; piston 111 having a piston rod 08 with sealing disk 07 and sealing member 03 arranged within the valve body 222; Anker 06 and fixed guide 05 is mounted into cavity of valve body 222 and piston rod 08 is supported by means of fixed guide 05 and Anker 06; solenoid coil 9 surrounds the piston rod 08; spring 01 and spring 02 resiliently biasing on the Piston 111 to seal air vent 30 into sealing engagement with the sealing member 03 and liquid outlet 40 with the sealing disk 07 by means of compression force when the solenoid coil 09 is in its de-energized condition; when the solenoid coil 09 is energized and Piston 111 moves away from air vent 30 and liquid outlet 40 simultaneously, so that the valve is open, and air will enter into the bowl 10 through valve body 222 through air path 200 and liquid is drained form bowl 10 through liquid inlet 40' into valve body 222 and drained out form liquid outlet 40.

One of the embodiments of the present invention is to provide an auto drain valve 100 comprises a piston 111 comprises piston rod 08 with sealing disk 07 and sealing member 03 wherein spring 01 and spring 02 resiliently biasing on the sealing disk 07 and sealing member 03.

One of the embodiments of the present invention is to provide an auto drain valve 100 comprises a piston 111 comprises piston rod 08 with sealing disk 07 and sealing member 03 wherein spring 01 and spring 02 resiliently biasing on the sealing disk 07 and sealing member 03.

One of the embodiments of the present invention is to provide an auto drain valve 100 comprises a solenoid coil 09 in de-energized condition both air vent 30 and liquid inlet 40' are remain closed and during solenoid coil 09 energized condition piston rod 08 with sealing disk 07 and air vent 30 moves upward direction wherein air vent 30 and liquid outlet 40 open simultaneously. Further the magnetisable material is attached to the piston rod 08 are suitably arranged within the valve body 222 such that energisation of the solenoid coil 09 causes a magnetic field to be induced in the solenoid coil 09 and in the piston rod 08. In this embodiment, the piston rod 08 is then attracted to the solenoid coil 09, and movement of the piston rod 08 is affected.

One of the embodiments of the present invention is to provide an auto drain valve 100 which is consisting of sealing member for air path 200 and water path 300. Sealing members are made from any material and any shape. Sealing member for air vent and sealing member for water vent are may differ in size, shape and material as per requirement.

One of the embodiments of the present invention is to provide an auto drain valve 100 wherein sealing member provides hermetic seal to water path as well as air path 200.

One of the embodiments of the present invention is to provide an auto drain valve 100 wherein, sealing disk 07 and sealing member 03 for sealing air path 200 and water path 300. Sealing members can be moulded with sealing disk, detachably-attached with sealing disk or rigidly attached with sealing disk. Most preferably is detachably attached sealing member because if any damage to sealing member it can be easily changed or replaced.

One of the embodiments of the present invention is to provide an auto drain valve 100 wherein, solenoid coil 09 during de-energized condition both air vent 30 and liquid outlet 40 are remain closed and solenoid coil 09 during energized condition sealing disk 07 moves upward direction by means of piston 09 wherein air vent 30 and liquid outlet 40 open simultaneously.

One of the embodiments of the present invention is to provide an auto drain valve wherein spring 01 and spring 02 resiliently biasing on the sealing disk 07 and sealing member 03 provides compression force to the sealing disk 07 and sealing members 03 and said spring 01 and spring 02 can be coil spring, helical spring, spiral spring, leaf spring.

The Auto drain valve 100 connected at the bottom part of bowl 10 and filter screen 20 is connected at top part of the bowl 10 from where water is to be drain through valve body.

Figure 2:
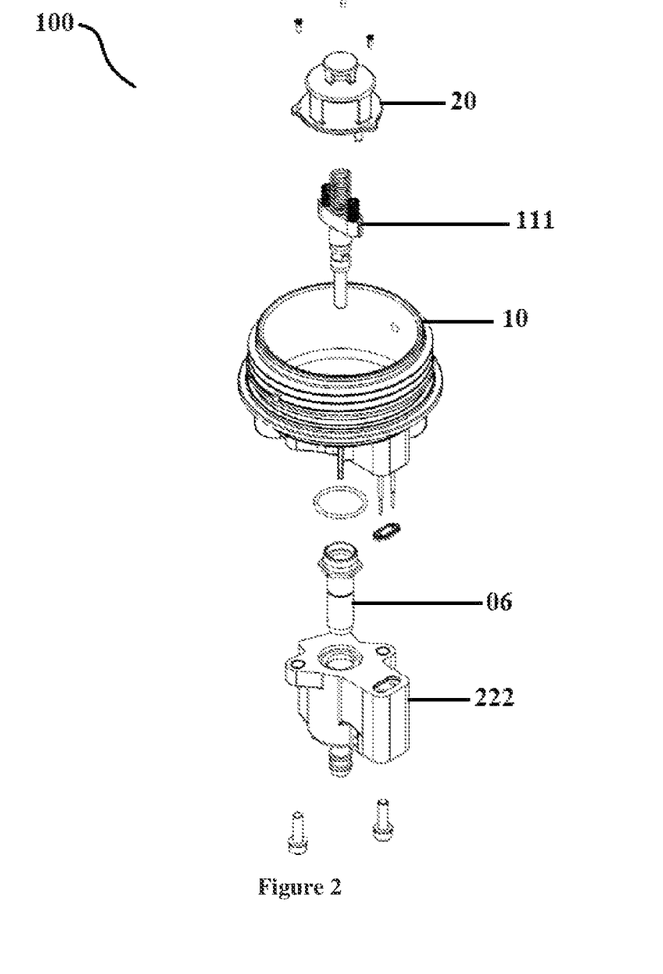
FIG. 2 is a exploded view of a preferred embodiment of an auto drain valve 100.

In one of the preferred embodiment Piston 111 consisting of piston rod 08 with sealing disk 07 and one or more sealing member 03 to seal air vent 30 is mounted onto said sealing disk 07 and sealing to seal liquid outlet 40. Further, piston rod 08 with sealing disk 07 and one or more sealing member 03 is movable within Anker 06, which is mounted into valve body 222. In this preferred embodiment, the spring 01 and spring 02 is a coil spring, but the spring 01 and spring 02 could be any other element for applying a resilient force to the Piston 111, biasing it toward the stop to close mainly liquid outlet 40 and air vent 30. The spring 01 is main spring mounted on sealing disk 07 to seal liquid outlet 40 and spring 02 is mounted on sealing member 03 to seal air vent 30. The valve body 222 comprises liquid inlet 40' and liquid outlet 40 which can be controlled by means of piston 111 by means of solenoid coil wherein solenoid coil 09 controls the movement of upward or downward of the piston 111 (FIG. 2).

Figure 3:
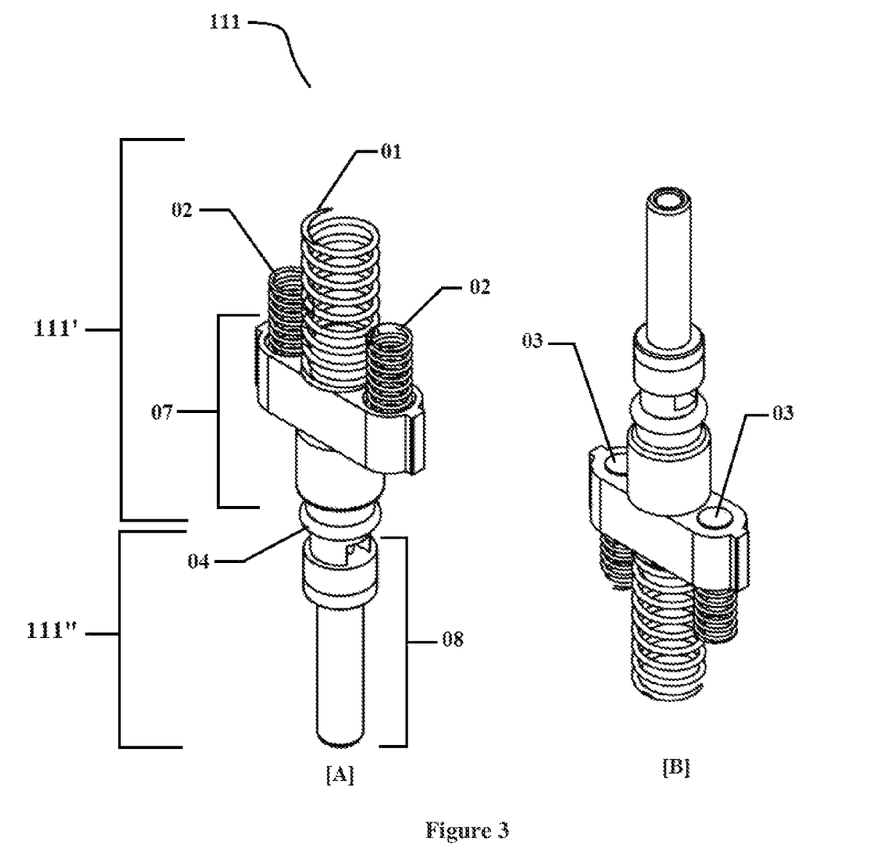
FIG. 3 is a perspective view of the solenoid valve, with portions removed to show details of the construction.

Further the piston 111 comprises upper part of the piston 111' and lower part of the piston 111" wherein upper part of the piston 111' comprises piston rod 08 with sealing disk 07 and one or more sealing member 03 to seal air vent 30; Further, lower part 111" comprises piston rod 08 is with sealing disk 07 and sealing member 03 to seal liquid outlet 40 and air vent 30. The piston 111 can be move within Anker 06, which is mounted into valve body 222. The spring 02 is located onto sealing member 03 to seal air vent 30 by means of compression force. The spring 01 main spring is mounted onto sealing disk 07 to seal liquid outlet 40 and air vent 30 by means of compression force (FIG. 3B the position of sealing member 03 which seals the air vent properly).

Figure 4:
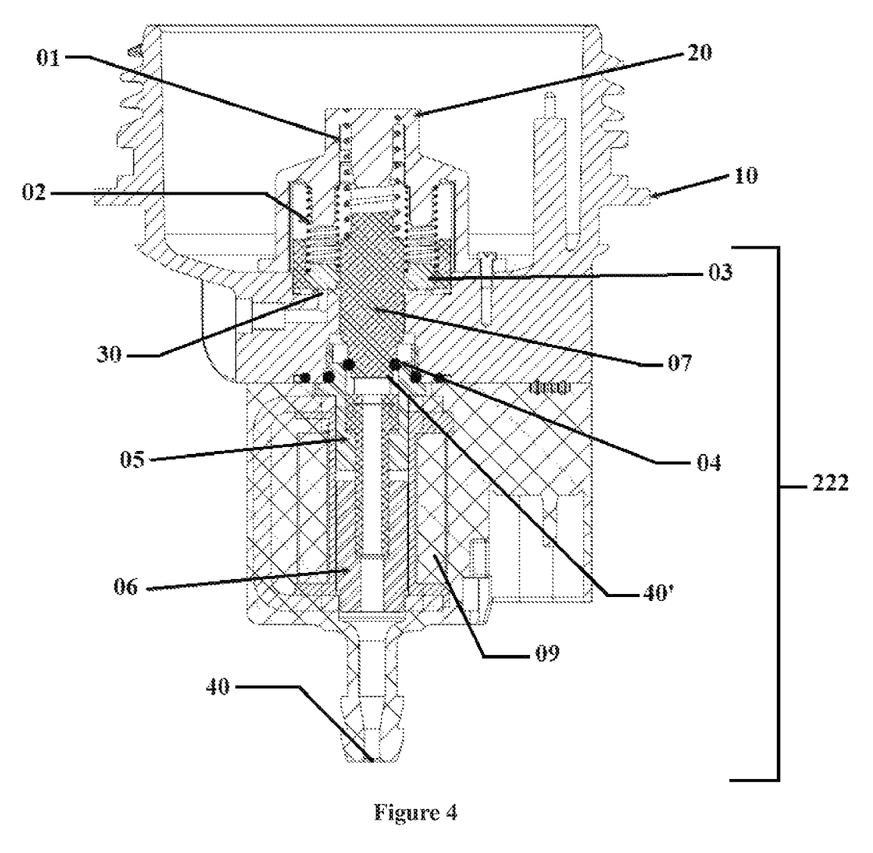
FIG. 4 is cross-sectional view of an auto drain valve 100.

FIG. 4 of the present invention illustrate the cross-sectional view of the auto drain solenoid valve 100 for draining liquid from fuel system wherein valve body 222 is connected at the bottom part of bowl 10 and filter screen 20 is connected at top part of the bowl 10 from where water is to be drain through valve body 222. Further, Anker 06 is mounted into cavity of valve body 222 and piston rod 08 of the piston 111 is supported by means of fixed guide 05. Further, the solenoid coil 09 controls the movement of upward or downward of the piston 111 wherein fixed guide 05 is allow to move piston rod 08 in upward and downward direction. Piston 111 consisting of piston rod 08 with sealing disk 07 to seal liquid outlet 40 and sealing member 03 to seal air vent 30. The piston 111 can be movable within Anker 06, which is mounted into valve body 222. The spring 02 is located onto sealing member 03 of the air vent 30 wherein spring 02 allows to remain close air vent 30 by means of compression force. Another way, the spring 01 said main spring is mounted onto sealing disk 07 which allows to close mainly water path 300 and air path 200. The valve body 222 comprises water intake and water outlet which can be controlled by means of piston 111 by means of solenoid coil wherein solenoid coil 09 controls the movement of upward or downward of the said piston 111.

Figure 5:
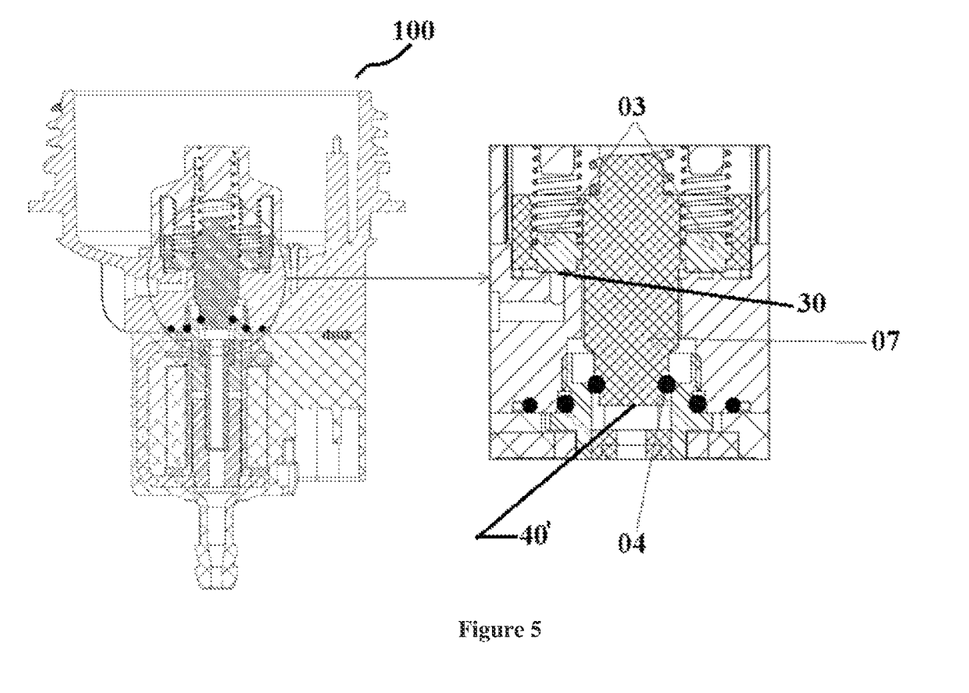
FIG. 5 is cross-sectional view of an auto drain valve 100, discloses energise and de-energise condition of an auto drain valve 100.

In one of the preferred embodiment FIG. 5 a cross-sectional view of an auto drain valve 100 wherein water from the fuel tank is collected into bowl 01. Filter screen 07 allows water to enter into drain system. An auto drain valve 100 having solenoid coil 09 surrounding Piston 111 a single body wherein, piston road 08 sealing disk 01 with rubber O ring 04, sealing member 03 is assembled in valve body, with water level indicator sensor.

FIG. 5 of the Piston 111 sealing of air vent 30 and the liquid outlet 40 wherein the spring 02 is located onto sealing member 03 sealing the air vent 30 by means of compression force and spring 01 said main spring is mounted on sealing disk 07 which seals water vent 40 and thus close water path 300 and air path 200 simultaneously.

The auto drain valve 100 when solenoid coil 09 is in de-energized wherein drain water is collected into bowl 10 which restricted by means of sealing member 01, which is located onto piston rod 08 of the Piston 111. During de-energized condition both air vent 30 and water path 300 are closed means air can't enter into the valve body and water does not vent from the valve body. FIG. 6B of the present invention discloses energized condition of the auto drain valve 100 wherein solenoid 09 is energized and said solenoid 09 lifts piston rod 08 towards up direction against compression force of main spring 01 and springs 03 which open air vent 30 and water vent 40 simultaneously. At the time of opening of air vent 30 and water vent 40, the air will enter into the bowl 10 through valve body 222 that denotes air path 200 into the FIG. 6B. 300 denote same way water path, which discloses water drain from bowl 10.

Figure 6A:
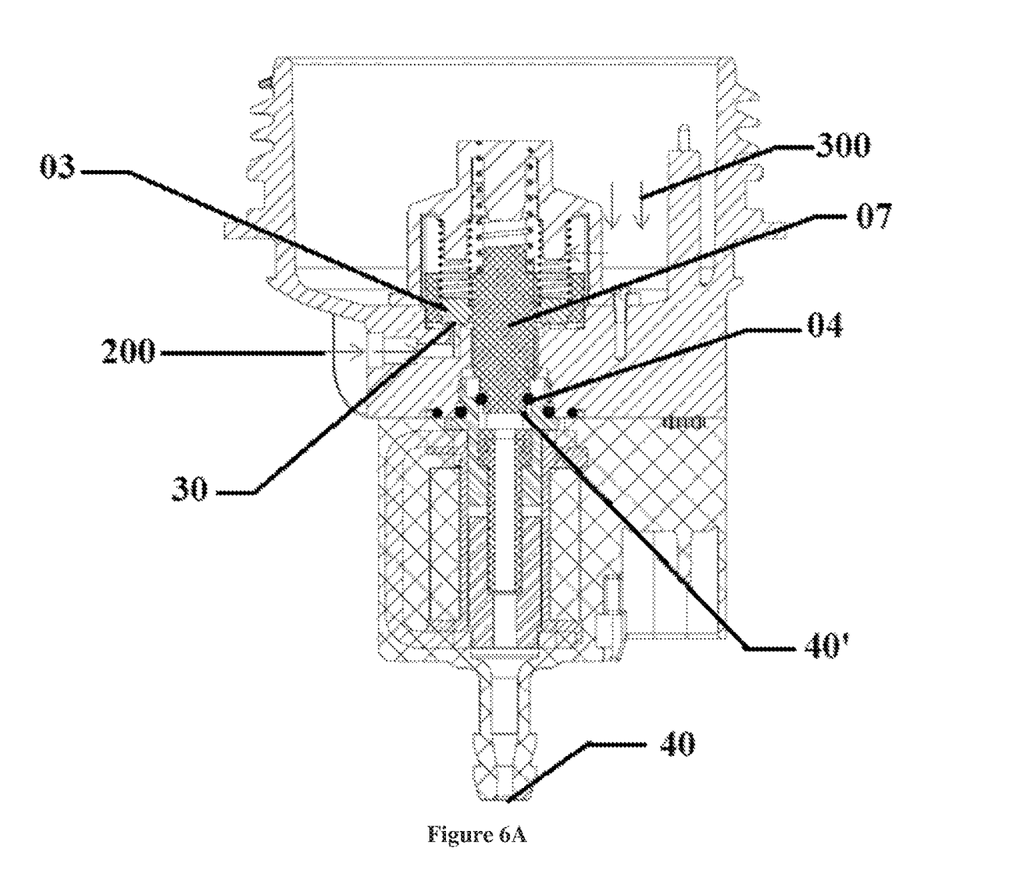
FIG. 6A is cross-sectional view of an auto drain valve 100, discloses de-energise condition of an auto drain valve 100 with air vent path 300 and water path 200 in closed condition.
Figure 6B:
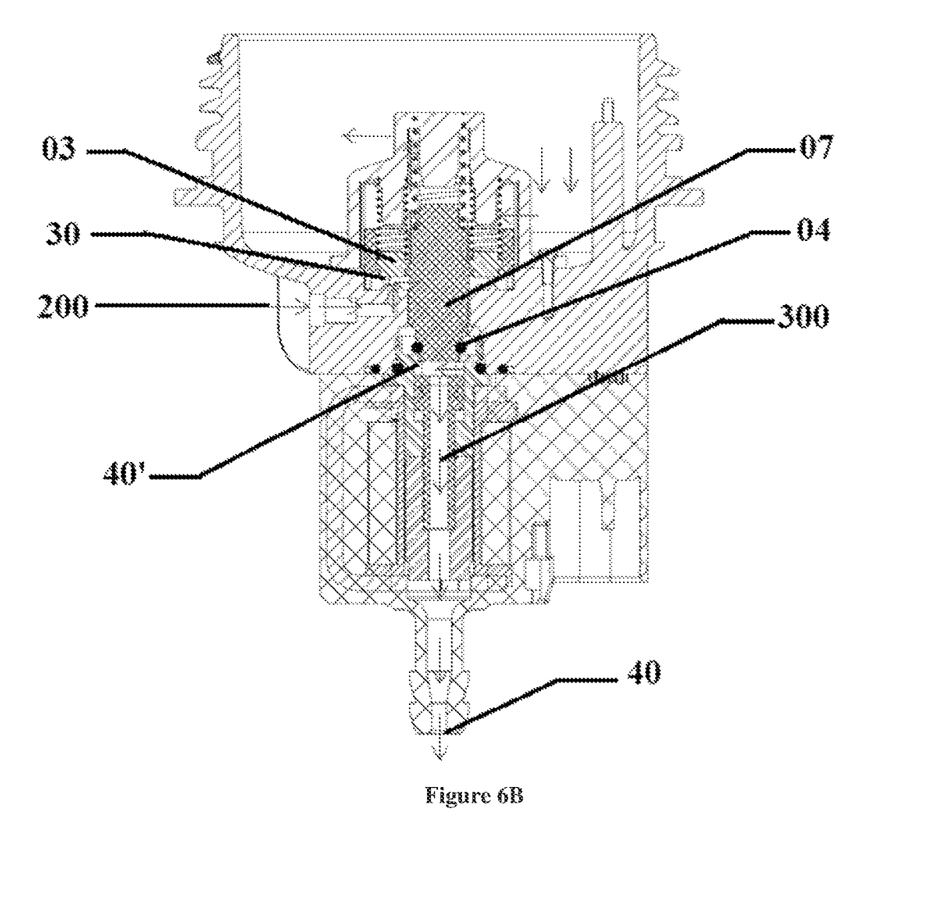
FIG. 6B is cross-sectional view of an auto drain valve 100, discloses energised condition of an auto drain valve 100 with air vent path 300 and water path 200 in open condition.

FIGS. 6A & 6B of the preferred embodiment wherein solenoid coil 09 in de-energise and energise condition of said valve 100 wherein FIG. 6A depicts solenoid coil 09 in de-energise condition wherein water drain path 200 and air vent 300 of the air vent path are sealed by O ring 04 respectively by the compression force of the spring 01. FIG. 6B depicts solenoid coil 09 in energise condition of said valve 100 wherein electric current flows into solenoid coil as solenoid coil 09 generates magnetic field. Due to magnetic field, a Piston 111 with piston rod 08 connected piston tarts to move upward direction against compression force of spring 06 sealing members 03 and sealing disk 07 with rubber O-ring 04 are rigidly fixed to seal Air vent 30 and liquid outlet 40 simultaneously. As sealing disk 03 starts to move upward direction; rubber O ring 04 opens water path 200 and air vent 03 path respectively. The solenoid coil 09 controls Open and close of the water drain path 200 and air vent 300 simultaneously.

A solenoid 9 (FIG. 6B), surrounds the Piston 111, and when energized moves the valve Piston 111 against the bias of the spring 01 away from the stop position. A sealing disk 07 with at least one sealing member 03 is mounted on the Piston 111 with a spring 01 and spring 02 that resiliently biasing the Piston 111 into sealing engagement to seal air vent 30 with the sealing member 03 and liquid outlet 40 with the sealing disk 07 when the Piston 111 when solenoid coil 09 is in de-energized condition. In this preferred embodiment, the spring 01 and spring 02 is a coil spring, but the spring 01 spring 02 could be any other element for applying a resilient force to the valve Piston 111, biasing it toward the de-energized condition.

The spring 01 and spring 02 biases the Piston 111 to seal toward the seal air vent 30 with the sealing member 03 and liquid outlet 40 with the sealing disk 07 by means of compression force. When the solenoid 09 is energized, it moves the Piston 111 against the bias of the spring 01 and spring 02 away from the air vent 30 and liquid outlet 40, so that the valve is open, and air will enter into the bowl 10 through valve body 222 and air path 200 and liquid is drained form bowl 10 through liquid inlet 40' into valve body 222 and drained out form liquid outlet 40. When the solenoid 09 is de-energized, the spring 01 and spring 02 biases the Piston 111 to seal toward the air vent 30 with the sealing member 03 and liquid outlet 40 with the sealing disk 07 by means of compression force. The Piston 111 contacts the valve air vent 30 and liquid outlet 40 stops moving, the Piston 111 by the spring 01 and spring 02, until the Piston 111 seals air vent 30 and liquid outlet 40, which arrests further movement of the Piston 111. Thus the air vent 30 and liquid outlet 40 open and close simultaneously which reduced fuel or water spillage during the draining.

As shown in FIGS. 1 and 2, the piston 111 comprises a piston rod 08 and a sealing disk 07 and sealing member 04 attached to one end of the rod 08. The sealing disk 07 is designed to create a sealing engagement with a drain/liquid outlet 40 and an air inlet/air vent 30 of the s auto drain solenoid valve 100 when the piston 111 is in the closed condition (as shown in FIG. 6A). The piston 111 slides within Anker 06 and fixed guide 05, which is mounted into valve body 222.

A bowl 10 is connected to fuel tank (not show in figure) open in one end for receiving liquid containing water form fuel tank and other end of the bowl 10 is connected to the valve body 222. The mouth of the valve body 222 has a liquid inlet 40' and a piston 111 comprising piston rod 08 with sealing disk 07 and sealing member 03. In the preferred embodiment, the sealing disk 07 and sealing member 03 may be made of a lightweight fluorinated hydrocarbon polymer such as Teflon, or other polymeric or resilient sealing material, or a combination of different materials bonded together. The piston 111 comprising piston rod 08 with sealing disk 07 and sealing member 03 sealingly engages the liquid outlet 40 and air vent 30 in a closed position when the solenoid 09 is not actuated. When the solenoid 09 is actuated, the piston 111 comprising piston rod 08 with sealing disk 07 and sealing member 03 moves away from the liquid outlet 40 and air vent 30. The initial movement of the piston 111 before the valve element 38 moves provides an impact to the valve element that helps unseat the valve element. As described above, when the solenoid 09 is de-actuated the spring 01 and spring 03 moves the piston 111 comprising piston rod 08 with sealing disk 07 and sealing member 03 toward the liquid outlet 40 and air vent 30. The sealing disk 07 and sealing member 03 contacts the liquid outlet 40 and air vent 30, and further movement of the piston 111 under the bias of spring 01 and spring 03. Thus, while the piston 111 operated by the solenoid 01 and to close the liquid outlet 40 and air vent 30 quickly when the solenoid is de-actuated, the impact of the sealing disk 07 and sealing member 03 moving toward its closed position, thereby preserving the life of the piston 111. Testing of one preferred embodiment of a solenoid valve incorporating the principles of the present invention has yielded 10 million cycles of flow control operation at 160 psig. Thus, the present invention to provide an economical robust valve design that can operate for a significant number of cycles without failure by significantly reducing the impact force of the valve against the valve seat when the valve is closed.

One of the embodiments of the present invention is to provide an auto drain valve wherein manually drain mechanism is also available in any emergency conditions. Manually mechanism to control valve comprises a screw mechanism or manual switch which energized solenoid manually.

In another embodiments of the present invention is to provide an auto drain valve which is easy to disassemble for maintains wherein bowl comprises threading mechanism which is easy to disengage said drain valve from fuel system. The present invention does not limit its scope by providing only threading mechanism but it can be any mechanism which can be detachably attached the said valve with fuel system.

In another embodiments of the present invention is to provide an auto drain valve having a water level indication sensor allows to energise drain valve system by reaching water at predefined level. Water sensor is located into the bowl wherein said sensor measures the level of water and drain said water automatically.

The advantages of the above described embodiment and improvements should be readily apparent to one skilled in the art, as to enabling a resilient, high cycling solenoid valve for fluid control. Additional design considerations, such as the control of the application of voltage to the solenoid coil, may be incorporated without departing from the spirit and scope of the invention. Accordingly, it is not intended that the invention be limited by the particular embodiment or form described above, but by the appended claims.

I claim:

1. An automatic drain valve for draining a liquid, the automatic drain valve comprising:
   a bowl;
   a valve body coupled to the bowl, the valve body comprising an air vent, a liquid inlet and a liquid outlet;
   a filter screen connected to a bottom of a bowl cavity of the bowl;
   a piston arranged within the valve body, the piston having a piston rod with a sealing disk and a sealing member; the piston rod extending into a passage between the liquid inlet and the liquid outlet;
   an anchor and a fixed guide mounted into a cavity of the valve body, wherein the fixed guide and the anchor are configured to support the piston rod;
   a solenoid coil housed in the valve body in between the liquid inlet and the liquid outlet surrounding the piston rod; and
   a set of springs configured to bias the piston to seal the air vent and the liquid inlet by engagement of the sealing member and the sealing disk with air vent and the liquid inlet respectively, on account of the biasing force when the solenoid coil is in de-energized condition;
   wherein an upper end of the set of springs is supported by a portion of the filter screen that projects into the bowl cavity of the bowl;
   wherein, when the solenoid coil is configured to, when energized, move the piston away from the air vent and the liquid inlet to simultaneously open the liquid outlet to drain the liquid from the bowl, and the air vent to allow air to enter into the bowl through the vent hole in the valve body; and
   wherein the sealing disk includes an O ring configured to close the liquid inlet when the piston is resting against the air vent and the liquid inlet under the biasing force of the set of springs.

2. The automatic drain valve as claimed in claim 1, wherein the set of springs comprises a first spring and a second spring to bias the piston towards the vent hole and the liquid inlet.

3. The automatic drain valve as claimed in claim 2, wherein one or both of the first spring and the second spring are any of a coil spring and a leaf spring.

4. The automatic drain valve as claimed in claim 1, wherein the air vent is fluidically coupled to an air passage in the valve body, the air passage connecting the air vent to an air source to provide a vent path.

5. The drain valve as claimed in claim 1, wherein valve body comprises a drain passage connecting the air liquid inlet to the liquid outlet.

6. The automatic drain valve as claimed in claim 1, wherein the bowl is configured to be coupled to a fuel system of a vehicle to collect water mixed with a fuel of the vehicle.

7. The automatic drain valve as claimed in claim 6, wherein the bowl includes threads for coupling to the fuel system of the vehicle.

8. The automatic drain valve as claimed in claim 1, wherein the piston rod includes a magnetisable material.

\* \* \* \* \*